US009963762B2

(12) United States Patent
Higaki et al.

(10) Patent No.: US 9,963,762 B2
(45) Date of Patent: May 8, 2018

(54) SCANDIUM RECOVERY METHOD (71) Applicant: SUMITOMO METAL MINING CO., LTD., Tokyo (JP)

(72) Inventors: Tatsuya Higaki, Niihama (JP);
Yoshitomo Ozaki, Niihama (JP);
Shin-ya Matsumoto, Niihama (JP);
Itsumi Matsuoka, Niihama (JP);
Hidemasa Nagai, Niihama (JP);
Toshihiko Nagakura, Niihama (JP);
Keiji Kudo, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 36 days.

(21) Appl. No.: 15/115,030

(22) PCT Filed: Jan. 21, 2015

(86) PCT No.: PCT/JP2015/051501
§ 371 (c)(1),
(2) Date: Jul. 28, 2016

(87) PCT Pub. No.: WO2015/115269
PCT Pub. Date: Jun. 8, 2015

(65) Prior Publication Data
US 2016/0340757 A1 Nov. 24, 2016

(30) Foreign Application Priority Data
Jan. 31, 2014 (JP) .................................. 2014-016901
Mar. 27, 2014 (JP) .................................. 2014-065879

(51) Int. Cl.
C22B 59/00 (2006.01)
C22B 3/44 (2006.01)
(Continued)

(52) U.S. Cl.
CPC ............ C22B 59/00 (2013.01); C22B 3/0005 (2013.01); C22B 3/08 (2013.01); C22B 3/42 (2013.01);
(Continued)

(58) Field of Classification Search
CPC ...... C22B 59/00; C22B 21/0015; C22B 34/32
(Continued)

(56) References Cited

U.S. PATENT DOCUMENTS 4,816,233 A 3/1989 Rourke et al.
7,282,187 B1 10/2007 Brown et al.
(Continued)

FOREIGN PATENT DOCUMENTS

EP 0775753 A1 5/1997
EP 2907883 A1 8/2015
(Continued)

OTHER PUBLICATIONS

"Kidozairyou to Oyogijutsu (Rare earth materials and application technique)", Edited by Kouka Ryu, published by Chemical Industry Press, May 2005, pp. 484-493 and partial English translation thereof.
(Continued)

Primary Examiner — Steven J Bos
(74) Attorney, Agent, or Firm — Locke Lord LLP (57) ABSTRACT In order to recover high-quality scandium from nickel oxide ores efficiently, this method comprises: a step (S1) for feeding Ni oxide ores and sulfuric acid into a pressure vessel, and subjecting the mixture to solid-liquid separation to form a leachate and a leach residue; a step (S2) for adding a neutralizing agent to the leachate, and thus forming a neutralization sediment and a post-neutralization fluid; a step (S3) for adding a sulfurizing agent to the post-neutralization fluid, and separating the obtained mixture into Ni (Continued)

sulfide and a post-sulfurization fluid; a step (S4) for bringing the post-sulfurization fluid into contact with a chelating resin, making Sc adsorbed on the chelating resin, and forming an Sc eluent; a step (S6) for bringing the Sc eluent into contact with an extracting agent, adding a back-extraction agent to the extract, and forming back-extracted matter; and a step (S8) for roasting the back-extracted matter, and forming Sc oxide.

10 Claims, 3 Drawing Sheets

(51) Int. Cl.
  *C22B 3/26* (2006.01)
  *C22B 3/08* (2006.01)
  *C22B 3/42* (2006.01)
  *C22B 21/00* (2006.01)
  *C22B 34/32* (2006.01)
(52) U.S. Cl.
  CPC ............ *C22B 3/44* (2013.01); *C22B 21/0015* (2013.01); *C22B 34/32* (2013.01); *Y02P 10/234* (2015.11)
(58) Field of Classification Search
  USPC ...................................... 423/21.1, 21.5, 263
  See application file for complete search history.

(56) References Cited

U.S. PATENT DOCUMENTS

| | | | |
|---|---|---|---|
| 9,399,804 B2* | 7/2016 | Ozaki | ........................ C22B 3/08 |
| 2012/0204680 A1 | 8/2012 | Duyvesteyn | |
| 2013/0074653 A1 | 3/2013 | Kobayashi et al. | |
| 2014/0314639 A1 | 10/2014 | Mihaylov et al. | |
| 2015/0184268 A1 | 7/2015 | Asano | |
| 2016/0047014 A1 | 2/2016 | Ozaki et al. | |

FOREIGN PATENT DOCUMENTS

| | | |
|---|---|---|
| JP | 01-108118 A | 4/1989 |
| JP | H01133920 A | 5/1989 |
| JP | H03173725 A | 7/1991 |
| JP | H09176756 A | 7/1997 |
| JP | H09194211 A | 7/1997 |
| JP | H09-208222 A | 8/1997 |
| JP | H-09-291320 A | 11/1997 |
| JP | 2000-507308 A | 6/2000 |
| JP | 3344194 B2 | 11/2002 |
| JP | 3428292 B2 | 7/2003 |
| JP | 3430973 B2 | 7/2003 |
| JP | 2014-001430 A | 1/2014 |
| JP | 2014-012901 A | 1/2014 |
| JP | 2014-218719 A | 11/2014 |
| JP | 2015-163729 A | 9/2015 |
| WO | 2012014685 A1 | 2/2012 |
| WO | 2014/181721 | * 11/2014 |

OTHER PUBLICATIONS

Office Action dated Dec. 9, 2016, issued for Chinese Patent Application No. 201580004295.2.
Notice of Reasons for Rejection issued to JP Application No. 2014-065879, dated Nov. 17, 2015.
Notice of Reasons for Rejection issued to JP Application No. 2014-065879, dated Mar. 1, 2016.
Wang Weiwei et al., "Recovery of scandium from synthetic red mud leach solution by solvent extraction with D2EHPA," Sep Purif Technol, NL, Apr. 19, 2013, vol. 108, p. 96-102.
Moriyasu, Kazuhisa et al., "Synthesis of hydroxyiminodiacetic acid-chelating resin and the properties of adsorption and separation for rare earth metal ion," Japan Analyst, Japan, Sep. 1990, vol. 39(9), pp. 475-480 and an English abstract thereof.
"Scandium Patent Comparison Table for Pacific Metals Co. Ltd. and Sumitomo Metal Mining Co. Ltd.", for Japanese patent application No. 2014-065879 and English translation thereof.
International Search Report dated Apr. 21, 2015, issued for PCT/JP2015/051501.
Weiwei Wang et al: "Metallurgical processes for scandium recovery from various resources: A review", Hydrometallurgy, Elsevier Scientific Publishing Cy. Amsterdam, NL, vol. 108, No. 1, Mar. 5, 2011 (Mar.5, 2011), pp. 100-108, XP028201019.
The extended European search report dated Feb. 3, 2017 issued for corresponding European Patent Application No. 15742736.0.
International Search Report dated Aug. 5, 2014, issued to International Application No. PCT/JP2014/061783.
Office Action dated Jan. 15, 2016, issued to U.S. Appl. No. 14/437,767.
Extended European Search Report dated May 12, 2016, issued to EP Patent Application No. 14794541.4.

* cited by examiner

FIG. 1 (FLOW CHART OF THE METHOD OF RECOVERING SCANDIUM ACCORDING TO THE PRESENT INVENTION)

RELATIONSHIP BETWEEN THE CONCENTRATION
OF SULFURIC ACID AND WASHING PERCENTAGE

SCANDIUM RECOVERY METHOD

TECHNICAL FIELD

The present invention relates to a method of recovering scandium. More specifically, the present invention relates to a method of efficiently recovering scandium contained in nickel oxide ore by performing solvent extraction with a chelating resin and an acidic extracting agent.

BACKGROUND ART

Scandium is extremely valuable as an additive for high-strength alloys and an electrode material for fuel cells. However, scandium has not yet been widely used due to small production quantity and high cost thereof.

Meanwhile, a trace amount of scandium is contained in nickel oxide ore such as laterite ore and limonite ore. However, nickel oxide ore has not been industrially used as a raw material for nickel for many years because the content level of nickel in nickel oxide ore is low. Consequently, very few studies also have been conducted for industrially recovering scandium from nickel oxide ore.

Nonetheless, in recent years, the HPAL process has been emerging for practical use in which nickel oxide ore is introduced into a pressure vessel along with sulfuric acid, and heated at a high temperature of 240 to 260° C. to allow solid-liquid separation into a nickel-containing leachate and a leach residue. A neutralizing agent is added to the leachate obtained from the HPAL process to separate impurities, and then a sulphidizing agent is added to recover nickel as nickel sulfide. Subsequently, this nickel sulfide is subjected to a known nickel refinement process to obtain electrolytic nickel and nickel salt compounds.

In the HPAL processes as described above, scandium contained in nickel oxide ore will be contained in a leachate along with nickel (see Patent Document 1). When a neutralizing agent is added to a leachate obtained from the HPAL process to separate impurities, and a sulphidizing agent is then added, nickel is recovered as nickel sulfide while scandium remains in the acidic solution after addition of the sulphidizing agent. In this way, nickel and scandium can effectively be separated by using the HPAL process.

Further, a method of recovering scandium from the above acidic solution has been proposed, the method comprising: allowing a chelating resin having an iminodiacetate salt as a functional group to adsorb scandium; separating impurities; and performing concentration (see Patent Documents 2 to 4).

In the meantime, a method of recovering scandium from nickel oxide ore by solvent extraction has also been proposed (see Patent Document 5). Patent Document 5 proposes a method of obtaining highly pure scandium oxide, the method comprising: adding an organic solvent to an aqueous phase scandium-containing solution to extract a scandium component into the organic solvent, the organic solvent comprising 2-ethylhexyl sulfonic acid-mono-2-ethylhexyl diluted with kerosene, and the aqueous phase scandium-containing solution containing one or more of at least iron, aluminum, calcium, yttrium, manganese, chromium and magnesium in addition to scandium; then adding an aqueous solution of hydrochloric acid in order to separate yttrium, iron, manganese, chromium, magnesium, aluminum and calcium extracted into the organic solvent along with scandium, and performing scrubbing to remove yttrium, iron, manganese, chromium, magnesium, aluminum and calcium: then adding an aqueous solution of NaOH to the organic solvent to transform scandium remained in the organic solvent into a slurry containing $Sc(OH)_3$; filtering this to obtain $Sc(OH)_3$, which is then dissolved in hydrochloric acid to obtain an aqueous solution of scandium chloride; adding oxalic acid to this to obtain a precipitate of scandium oxalate; filtering the precipitate to remove iron, manganese, chromium, magnesium, aluminum and calcium into a filtrate; and then performing calcination.

Patent Document 1: Japanese Unexamined Patent Application Publication No. H03-173725
Patent Document 2: Japanese Unexamined Patent Application Publication No. H01-133920
Patent Document 3: Japanese Unexamined Patent Application Publication No. H09-176756
Patent Document 4: Japanese Unexamined Patent Application Publication No. H09-194211
Patent Document 5: Japanese Unexamined Patent Application Publication No. H09-291320

DISCLOSURE OF THE INVENTION

Problems to be Solved by the Invention

However, iron, aluminum, chromium and the like show very small partition into an eluent, and are abundantly contained in a raw material. Therefore, multiple cycles of operations of adsorption and elution are required for separation when simply using a chelating resin alone. Further, separation of other trace impurities is difficult because their adsorption and elution behaviors show a high partition into an eluent albeit less so as compared with scandium.

Moreover, due to a very low content of scandium in nickel oxide ore, direct treatment of a process liquid in the solvent extraction is difficult in terms of the recovery rate thereof and the cost of large capacity equipment required.

As discussed above, a method of industrially recovering scandium from nickel oxide ore has not yet been found.

An objective of the present invention is to recover high grade scandium from nickel oxide ore in a convenient and efficient way.

Means for Solving the Problems

After conducting extensive studies to solve the above problems, the present inventors found that high grade scandium can be obtained conveniently and efficiently by separating scandium with a chelating resin and further performing solvent extraction to obtain a scandium-containing material, and then calcining the scandium-containing material. Then the present invention has been completed. Specifically, the present invention provides the followings.

(1) The present invention provides a method of recovering scandium, the method comprising: a leaching step of introducing nickel oxide ore containing scandium, aluminum and chromium into a pressure vessel along with sulfuric acid, and performing solid-liquid separation into a leachate and a leach residue under high temperature and high pressure; a neutralization step of adding a neutralizing agent to the leachate to obtain a neutralized precipitate and a post-neutralization liquid; a sulfuration step of adding a sulphidizing agent to the post-neutralization liquid to allow separation into nickel sulfide and a post-sulfuration liquid; an ion exchange step of bringing the post-sulfuration liquid into contact with a chelating resin to allow adsorption of the above scandium by the chelating resin, thereby obtaining a scandium eluent; a solvent extraction step of bringing the scandium eluent into contact with an extracting agent, and adding a backward extracting agent to an extract liquid to obtain a backward extract material; and a roasting step of calcining the backward extract material to obtain scandium oxide.

(2) The present invention also provides the method according to (1), wherein the chelating resin has iminodiacetic acid as a functional group, and the ion exchange step comprises an adsorption step of bringing the post-sulfuration liquid into contact with the chelating resin to allow adsorption of the above scandium by the chelating resin; an aluminum removing step of bringing the chelating resin which has adsorbed scandium in the adsorption step into contact with 0.1 N or less of sulfuric acid to remove aluminum which has been adsorbed by the chelating resin in the adsorption step; a scandium elution step of bringing the chelating resin which has been subjected to the aluminum removing step into contact with 0.3 N or more to less than 3 N of sulfuric acid to obtain the scandium eluent; and a chromium removing step of bringing the chelating resin which has been subjected to the scandium elution step into contact with 3 N or more of sulfuric acid to remove chromium which has been adsorbed by the chelating resin in the adsorption step.

(3) The present invention also provides the method of recovering scandium according to (1) or (2), further comprising: a concentration step of generating a scandium-containing precipitate from the scandium eluent after the ion exchange step, and acid-dissolving the precipitate to obtain a scandium concentrate, wherein the solvent extraction step comprises a step of bringing the scandium concentrate into contact with the extracting agent to obtain a backward extract material.

(4) The present invention also provides the method of recovering scandium according to (3), wherein the concentration step comprises a step of adjusting pH to an range of between 8 or more and 9 or less by adding a neutralizing agent to the scandium eluent to produce a neutralized material; and a step of acid-dissolving the neutralized material in sulfuric acid or hydrochloric acid.

(5) The present invention also provides the method of recovering scandium according to (3) or (4), wherein the concentration step comprises a step of adding oxalic acid to the scandium eluent to generate crystals of scandium oxalate; and a step of acid-dissolving the crystals of scandium oxalate in sulfuric acid or hydrochloric acid.

(6) The present invention also provides the method of recovering scandium according to any one of (1) to (5), wherein the extracting agent is an acidic extracting agent.

(7) The present invention also provides the method of recovering scandium according to (6), wherein the acidic extracting agent is di-2-ethylhexyl phosphoric acid.

(8) The present invention provides the method of recovering scandium according to any one of (1) to (7), wherein the backward extracting agent is sodium hydroxide with a concentration of 5 mol/l or more to 8 mol/l or less, and the backward extract material is a precipitate of scandium hydroxide.

(9) The present invention also provides the method of recovering scandium according to any one of (1) to (8), wherein the solvent extraction step comprises: an extraction step of mixing the scandium eluent with the extracting agent to allow separation into a post-extraction organic solvent containing extracted scandium and a raffinate liquid, the extracting agent being an organic solvent; a scrubbing step of mixing the post-extraction organic solvent with a hydrochloric acid solution with a concentration of 5.0 mol/l or more to 7.0 mol/l or less or a sulfuric acid solution with a concentration of 2.5 mol/l or more to 3.5 mol/l or less to separate impurities from the post-extraction organic solvent, thereby obtaining a post-washing organic solvent; and a backward extraction step of adding the backward extracting agent to the post-washing organic solvent to perform backward extraction of scandium from the post-washing organic solvent, thereby obtaining the backward extract material.

(10) The present invention also provides the method of recovering scandium according to (9), wherein the acidic extracting agent is 2-ethylhexyl phosphoric acid-mono-2-ethylhexyl.

(11) The present invention also provides the method of recovering scandium according to (10), comprising: an extraction step of mixing the scandium eluent with the extracting agent to allow separation into a post-extraction organic solvent containing extracted scandium and a raffinate liquid, the extracting agent being an organic solvent; a scrubbing step of mixing the post-extraction organic solvent with a hydrochloric acid solution with a concentration of 5.0 mol/l or more to 7.0 mol/l or less or a sulfuric acid solution with a concentration of 2.0 mol/l or more to 5.0 mol/l or less to separate impurities from the post-extraction organic solvent, thereby obtaining a post-washing organic solvent; a step of adding 5 mol/l or more to 8 mol/l or less of sodium hydroxide to a post-scrubbing organic solvent obtained from the scrubbing step to obtain a scandium hydroxide precipitate; and a step of adding an acid to the scandium hydroxide precipitate to obtain a scandium solution.

(12) The present invention also provides the method of recovering scandium according to any one of (1) to (9), further comprising: a scandium precipitation step of dissolving the backward extract material in hydrochloric acid after the solvent extraction step, and adding oxalic acid to a hydrochloric acid solution obtained from the dissolution to obtain crystals of scandium oxalate, wherein the roasting step comprises calcining the crystals of scandium oxalate.

Effects of the Invention

According to the present invention, high grade scandium can be efficiently recovered from nickel oxide ore.

PREFERRED MODE FOR CARRYING OUT THE INVENTION

Below, specific embodiments of the present invention will be described in detail, but the present invention shall not be limited to the following embodiments in any sense. Modifications may be made appropriately to the present invention without departing from the scope of the present invention.

Figure 1:
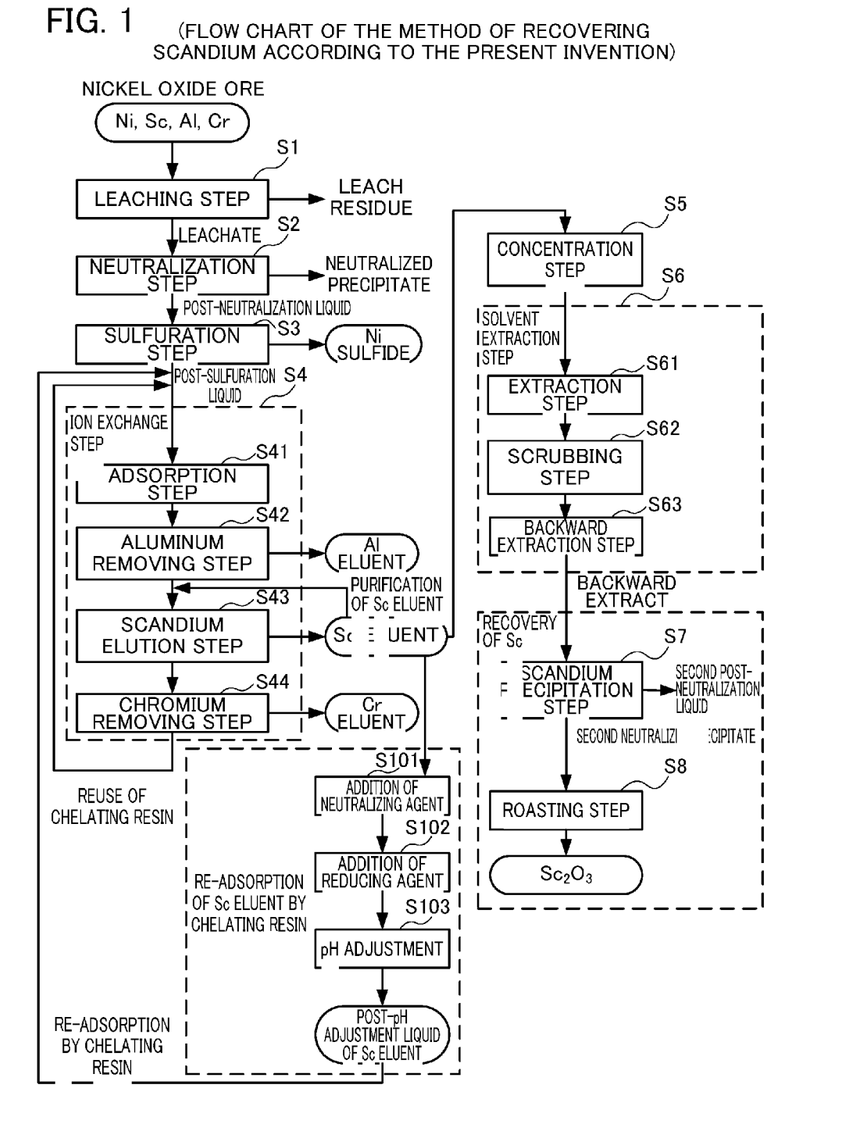
FIG. 1 describes the method of recovering scandium according to the present invention.

FIG. 1 describes the method of recovering scandium according to the present invention. The present invention provide a method of recovering scandium, the method comprising: a leaching step S1 of introducing nickel oxide ore containing scandium, aluminum and chromium into a pressure vessel along with sulfuric acid, and performing solid-liquid separation into a leachate and a leach residue under high temperature and high pressure; a neutralization step S2 of adding a neutralizing agent to the leachate to obtain a neutralized precipitate and a post-neutralization liquid; a sulfuration step S3 of adding a sulphidizing agent to the post-neutralization liquid to allow separation into nickel sulfide and a post-sulfuration liquid; an ion exchange step S4 of bringing the post-sulfuration liquid into contact with a chelating resin to allow adsorption of the above scandium by the chelating resin, thereby obtaining a scandium eluent; a solvent extraction step S6 of bringing the scandium eluent into contact with an extracting agent, and adding a backward extracting agent to an extract liquid to obtain a backward extract material; and a roasting step S8 of calcining the backward extract material to obtain scandium oxide.

The present invention is characterized by that an ion exchange is used in combination with solvent extraction when recovering and purifying scandium. By using the method according to the present invention, impurities can be separated out more thoroughly to obtain a high grade product, and stable operations can be achieved with compact equipment even when a raw material containing a large amount of impurities such as nickel oxide ore is used.

Note that a concentration step S5 of generating a scandium-containing precipitate from the scandium eluent, and acid-dissolving the precipitate to obtain a scandium concentrate may be performed after the ion exchange step S4 but before the solvent extraction step S6. However, this is not an essential aspect.

Further, a scandium precipitation step S7 of dissolving the backward extract material in hydrochloric acid, and adding oxalic acid to the hydrochloric acid solution obtained from the above dissolution to obtain crystals of scandium oxalate may also be performed after the solvent extraction step S6 but before the roasting step S8. However this is not an essential aspect.

Moreover, the ion exchange step S4 may be performed again using a post-pH adjustment liquid of a scandium eluent obtained by adding a neutralizing agent to the scandium eluent obtained from the previous ion exchange step S4 (Step S101), and then adding a reducing agent (Step S102), and then adding sulfuric acid (Step S103). However, this is not an essential aspect. The grade of recovered scandium can be further increased when these steps are used.

<Leaching Step S1>

In the leaching step S1, nickel oxide ore containing scandium, aluminum and chromium is introduced into a pressure vessel along with sulfuric acid, and solid-liquid separation into a leachate and a leach residue is performed under high temperature and high pressure.

The leaching step S1 may be performed according to any conventionally known HPAL process, for example, as described in Patent Document 1.

<Neutralization Step S2>

In the neutralization step S2, a neutralizing agent is added to the leachate obtained from the leaching step S1, thereby obtaining a neutralized precipitate and a post-neutralization liquid. Valuable metals such as scandium and nickel will be contained in the post-neutralization liquid while most impurities such as aluminum will be contained in the neutralized precipitate.

Any conventionally known neutralizing agents can be used. They can include, for example, calcium carbonate, slaked lime, sodium hydroxide and the like.

In the neutralization step, the pH is preferably adjusted to the range of 1 to 4, more preferably to the range of 1.5 to 2.5. A pH of less than 1 is not preferred because neutralization will be insufficient, and a neutralized precipitate and a post-neutralization liquid may not be sufficiently separated. A pH of more than 4 is not preferred because not only impurities such as aluminum but also valuable metals such as scandium and nickel will be contained in the neutralized precipitate.

<Sulfuration Step S3>

In the sulfuration step S3, a sulphidizing agent is added to the post-neutralization liquid to allow separation into sulfides and a post-sulfuration liquid. Nickel, cobalt, zinc and the like will be contained in the sulfides, and scandium and the like will be contained in the post-sulfuration liquid.

Any conventionally known sulphidizing agents can be used. They can include, for example, gaseous hydrogen sulfide, sodium sulfide, sodium hydrogen sulfide and the like.

<Ion Exchange Step S4>

In the ion exchange step S4, the post-sulfuration liquid is brought into contact with a chelating resin to allow adsorption of scandium by the chelating resin, thereby obtaining a scandium eluent. There is no particular limitation for the aspect of the ion exchange step S4, but the ion exchange step S4 preferably comprises: an adsorption step S41 of bringing the post-sulfuration liquid into contact with a chelating resin to allow adsorption of scandium by the chelating resin; an aluminum removing step S42 of bringing the chelating resin which has adsorbed scandium in the adsorption step S41 into contact with 0.1 N or less of sulfuric acid to remove aluminum which has been adsorbed by the chelating resin in the adsorption step S41; a scandium elution step S43 of bringing the chelating resin which has been subjected to the aluminum removing step S42 into contact with 0.3 N or more to 3 N or less, more preferably 0.4 N or more to 0.6 N or less of sulfuric acid to obtain a scandium eluent; and a chromium removing step S44 of bringing the chelating resin which has been subjected to the scandium removing step S43 into contact with 3 N or more of sulfuric acid to remove chromium which has been adsorbed by the chelating resin in the adsorption step S41.

[Adsorption Step S41]

In the adsorption step S41, the post-sulfuration liquid is brought into contact with a chelating resin to allow adsorption of scandium by the chelating resin.

There is no particular limitation for the type of the chelating resin, but it is preferably a resin having iminodiacetic acid as a functional group.

Meanwhile, the lower the pH range is, the less the amount of adsorption of impurities contained in nickel oxide ore. Therefore, adsorption of impurities by the chelating resin can be minimized when passing a liquid in a pH range as low as possible through the chelating resin. However, in a case where the pH is 2 or less, the amount of adsorption of scandium is also decreased as is that of impurities. Therefore, it is not preferred to pass a liquid in an extremely low pH range through a resin for adsorption.

[Aluminum Removing Step S42]

In the aluminum removing step S42, the chelating resin which has adsorbed scandium in the adsorption step S41 is brought into contact with 0.1 N or less of sulfuric acid to remove aluminum which has been adsorbed by the chelating resin in the adsorption step S41.

When removing aluminum, the pH is preferably maintained in the range of between 1 or more and 2.5 or less, and more preferably maintained in the range of between 1.5 or more and 2.0 or less. A pH of less than 1 is not preferred because not only aluminum but also scandium may be removed from the chelating resin. A pH of more than 2.5 is not preferred because aluminum may not be removed from the chelating resin in a desired fashion.

[Scandium Elution Step S43]

In the scandium elution step S43, the chelating resin which has been subjected to the aluminum removing step S42 is brought into contact with 0.3 N or more to less than 3 N of sulfuric acid to obtain a scandium eluent.

When obtaining a scandium eluent, the normality of sulfuric acid for use as an eluent is preferably maintained in the range of between 0.3 N or more and less than 3 N, and more preferably maintained in the range of between 0.5 N or more and less than 2 N. A normality of more than 3 N is not preferred because not only scandium but also chromium may be contained in a scandium eluent. A normality of less than 0.3 N is not preferred because scandium may not appropriately be removed from the chelating resin in a desired fashion.

[Chromium Removing Step S44]

In the chromium removing step S44, the chelating resin which has been subjected to the scandium elution step S43 is brought into contact with 3 N or more of sulfuric acid to remove chromium which has been adsorbed by the chelating resin in the adsorption step S41.

A normality of sulfuric acid for use as an eluent of less than 3 N is not preferred when removing chromium because chromium may not appropriately be removed from the chelating resin.

[Iron Removing Step]

Iron may also be contained in nickel oxide ore as an impurity although not shown in the figures. In that case, the chelating resin which has adsorbed scandium in the adsorption step S41 is preferably brought into contact with sulfuric acid having a normality smaller than that of sulfuric acid used in the aluminum removing step S42 before the aluminum removing step S42 to remove iron which has been adsorbed by the chelating resin in the adsorption step S41.

The pH is preferably maintained in the range of between 1 or more and 3 or less when removing iron. A pH of less than 1 is not preferred because not only iron but also scandium may be removed from the chelating resin. A pH of more than 3 is not preferred because iron may not be removed from the chelating resin in a desired fashion.

<Re-Adsorption of Scandium Eluent by Chelating Resin>

Further, although not an essential aspect, the adsorption step S41, the aluminum removing step S42 and the scandium elution step S43 are preferably performed again using a post-pH adjustment liquid of the scandium eluent obtained by adding a neutralizing agent to the scandium eluent obtained from the scandium elution step S43 to adjust pH to a range of between 2 or more and 4 or less, preferably to a range of between 2.7 and 3.3, centered around pH 3 (Step S101), then, adding a reducing agent (Step S102), and then adding sulfuric acid to adjust pH to a range of between 1 or more and 2.5 or less, preferably to a range of between 1.7 and 2.3, centered around pH 2 (step S103). The grade of recovered scandium can be further increased when these steps are used. Moreover, the cost of chemicals and the scale of equipment for separating scandium from the scandium eluent can be reduced.

A reducing agent is preferably added so that the oxidation-reduction potential (ORP) is maintained in the range of between more than 200 mV and 300 mV or less as determined using a silver-silver chloride electrode as the reference electrode. In a case where the oxidation-reduction potential is 200 mV or less, the sulfur content from the sulphidizing agent added may precipitate as a fine solid substance, which may clog a filter in a filtering step after sulfuration to deteriorate solid-liquid separation, resulting in decreased productivity, or may cause a clog or a biased liquid flow in the resin column when a liquid is passed through the chelating resin again. On the other hand, in a case where the oxidation-reduction potential is more than 300 mV, remaining iron ions and the like may be disadvantageously adsorbed by the resin, interfering with adsorption of scandium.

Any conventionally known neutralizing agents can be used. They can include, for example, calcium carbonate and the like. Further, any conventionally known reducing agents can be used. They can include, for example, sulphidizing agents such as gaseous hydrogen sulfide and sodium sulfide, gaseous sulfur dioxide, hydrazine, metal iron and the like.

When allowing a chelating resin to re-adsorb the scandium eluent, the chelating resin may be one already used, or may be a fresh one. However, a chelating resin which has been subjected to the chromium removing step S44 may be preferably used, or a fresh chelating resin may be preferably used in view of preventing contamination of impurities. In particular, when a chelating resin which has been subjected to the chromium removing step S44 is re-used, not only contamination of impurities can be prevented, but also the amount of a chelating resin to be used can also be reduced.

<Purification of Scandium Eluent>

The concentration of the scandium eluent can be increased by subjecting the scandium eluent obtained from the scandium elution step S43 to the scandium elution step S43 again.

The concentration of recovered scandium increases as the number of repeated scandium elution steps S43 increases. However, if the number of repetition is too large, the rate of increase in the concentration of recovered scandium becomes small. Therefore, the number of repeated scandium elution steps S43 is preferably 8 or less.

<Concentration Step S5>

Although not essential, the followings are also preferably performed: the concentration step S5 is provided after the ion exchange step S4, in which a precipitate of scandium contained in the scandium eluent is generated to separate impurities, and the precipitate is further dissolved in sulfuric acid and/or hydrochloric acid to provide an extraction starting liquid for use in the next step of solvent extraction.

Any of the following can be used as specific concentrating means: hydroxide neutralization, oxalate formation, or the combination of hydroxide neutralization and oxalate formation, but dissolution may be preferably near the solubility of the resulting precipitate. When dissolved near the solubility of the resulting precipitate, a solid can be precipitated once, and then re-dissolved at any concentration level. Therefore, the concentration of scandium can be targeted at any level and can be increased to that level. This may represent an industrially much preferred aspect in view of reducing a liquid volume in the next solvent extraction step and, in turn, reducing an equipment scale.

Note that either hydrochloric acid or sulfuric acid can be used as an acid for the precipitate obtained at the present step, but sulfuric acid is preferred.

[Hydroxide Neutralization]

Below, hydroxide neutralization as a mode of concentration will be described. When using hydroxide neutralization, a neutralizing agent is added to the scandium eluent obtained in the ion exchange step S4 to obtain a precipitate, which is then subjected to solid-liquid separation. Subsequently, the precipitate is dissolved in an acid to obtain an acidic solution.

Any conventionally known neutralizing agents can be used. They can include, for example, calcium carbonate, slaked lime, sodium hydroxide and the like. The neutralizing agent, however, is preferably sodium hydroxide and the like in a case where the scandium eluent is a sulfuric acid solution because a neutralizing agent containing a Ca content may generate gypsum.

A pH upon adding a neutralizing agent is preferably 8 or more to 9 or less. A pH of less than 8 is not preferred because neutralization may be insufficient, and Sc may not be sufficiently recovered. A pH of more than 9 is not preferred in terms of increased cost because the amount of a neutralizing agent to be used will be increased.

[Oxalate Formation]

Now, oxalate formation as another mode of concentration will be described. When using oxalate formation, oxalic acid is added to the scandium eluent to obtain crystals of scandium oxalate. A pH at that time is preferably 0 or more to 0.5 or less. A too low pH is not preferred because the solubility of scandium oxalate may be increased, resulting in a decreased scandium recovery rate. A too high pH is not preferred because impurities contained in the solution may precipitate, resulting in a decreased purity of scandium.

Further, the addition amount of oxalic acid is preferably 1.05 times or more to 1.2 times or less relative to the equivalent amount required for precipitating scandium as an oxalate salt. An addition amount of less than 1.05 times of the required equivalent amount is not preferred because the total recovery of scandium may not be achieved. On the other hand, an addition amount of more than 1.2 times of the required equivalent amount is not preferred because scandium may be re-dissolved due to an increased solubility of scandium oxalate, resulting in a decreased recovery rate.

[Combined Use of Hydroxide Neutralization and Oxalate Formation]

Further, examples of another mode of concentration can include performing both the aforementioned hydroxide neutralization and the aforementioned oxalate formation. First, the aforementioned hydroxide neutralization is performed on the scandium eluent obtained from the scandium elution step S43 to obtain a precipitate containing scandium hydroxide. Then, hydrochloric acid is added to that precipitate to obtain a re-dissolution liquid, to which oxalic acid is added to precipitate scandium oxalate as crystals. Subsequently, the crystals are acid-dissolved as described above, and subjected to the solvent extraction step S6.

By providing the concentration step S5, impurities contained in the scandium eluent can be significantly removed, and the number of steps in the ion exchange step S4 and the solvent extraction step S6 can be reduced. Further, the concentration of a starting liquid for solvent extraction can be appropriately adjusted. This may also have the following advantageous effects: the investment in plant and equipment may be reduced because the size of plant and equipment required by the solvent extraction step S6 can be reduced; and stable operations may be achieved because the concentration of a starting liquid is stable.

<Solvent Extraction Step S6>

In the solvent extraction step S6, the scandium eluent is brought into contact with an extracting agent, and a backward extracting agent is then added to an extract liquid to obtain a backward extract material. There is no particular limitation for the mode of the solvent extraction step S6, but the solvent extraction step S6 preferably comprises: an extraction step S61 of mixing the scandium eluent with an extracting agent to allow separation into a post-extraction organic solvent containing extracted scandium and a raffinate liquid, the extracting agent being an organic solvent; a scrubbing step S62 of mixing the post-extraction organic solvent with a hydrochloric acid solution or a sulfuric acid solution to separate impurities from the post-extraction organic solvent, thereby obtaining a post-washing organic solvent; and a backward extraction step S63 of adding a backward extracting agent to the post-washing organic solvent to perform backward extraction of scandium from the post-washing organic solvent, thereby obtaining a backward extract material. By performing the solvent extraction step S6, the purity of scandium contained in the scandium eluent can further be increased.

[Extraction step S61]

In the extraction step, the scandium eluent is mixed with an organic solvent containing an extracting agent to selectively extract scandium into the organic solvent. There are various types of extracting agents, but in view of the selectivity for scandium, preferably used are acidic extracting agents containing phosphorus, in particular, di-2-ethylhexyl phosphoric acid (D2EHPA), 2-ethylhexyl phosphoric acid-mono-2-ethylhexyl(2-ethylhexy 2-ethylhexyl phosphoric acid) (Product name: PC-88A) and the like.

When performing extraction, they are preferably used after diluted with, for example, a hydrocarbon-based organic solvent and the like. There is no particular limitation for the concentration of D2EHPA or PC-88A in an organic solvent, but in view of the phase separability and the like upon extraction and backward extraction, the concentration is preferably 10 vol % or more to 30 vol % or less, more preferably 15 vol % or more to 25 vol % or less, including in particular around 20 vol %.

Further, for the volume ratio of the organic solvent and the scandium eluent when performing extraction, the molar amount of the organic solvent is preferably 0.4 times or more to 1.0 times or less relative to the molar amount of the metal in the scandium solution.

[Scrubbing (Washing) Step S62]

In a case where impurity elements are present other than scandium in a solvent containing extracted scandium, the organic solvent (organic phase) is preferably subjected to scrubbing (washing) treatment to separate impurity elements out into the aqueous phase, thereby removing them from the extracting agent before performing backward extraction of the extract liquid. However this is not an essential aspect.

A solution of hydrochloric acid or sulfuric acid can be used for the scrubbing solution (washing solution). In a case where a hydrochloric acid solution is used, the concentration range is preferably 5.0 mol/l or more to 7.0 mol/l or less. In a case where a sulfuric acid solution is used, the concentration range is preferably 2.5 mol/l or more to 3.5 mol/l or less for D2EHPA, and preferably 2.0 mol/l or more to 5.0 mol/l or less for PC-88A, respectively.

The number of plates for washing (the number of times) in a case where the phase ratio of the organic phase (O) and the aqueous phase (A) O/A=1 may depend on types and concentrations of impurity elements, and can be altered depending on each acidic extracting agent and condition. As an example, the number of plates of 3 to 5 for DE2HPA and the number of plates of 3 to 8 for PC-88A can be enough for removing almost all of the elements to the levels below the detection limits.

[Backward Extraction Step S63]

In the backward extraction step S63, backward extraction of scandium is performed from an organic solvent containing extracted scandium. The backward extraction step S63 involves mixing the organic solvent with a backward extracting solution (backward extraction starting liquid) to reverse the reaction of extraction.

Since the present invention uses an acidic extracting agent as an extracting agent, an alkali substance needs to be used to break bonds of scandium contained in the organic solvent in order to separate scandium from the organic solvent. Therefore, the backward extracting solution (backward extraction starting liquid) is preferably a strongly alkaline solution such as sodium hydroxide. Scandium hydroxide will be generated as a precipitate at a pH of 8 or more. Therefore, in a case where the backward extracting solution is sodium hydroxide, the amount of scandium hydroxide to be used is preferably such that the pH can be maintained between 8 or more and 9 or less in view of both generation of a precipitate and avoidance of excess use. In addition, the concentration of sodium hydroxide is preferably 5 mol/l or more to 8 mol/l or less.

In a case where backward extraction is performed with an alkali substance, the product will be a mixture of solid scandium hydroxide and a liquid phase containing an organic solvent and a post-backward extraction alkaline liquid, and is in a slurry form. Accordingly, the product is first filtered to separate solid scandium hydroxide from the liquid phase. Then, an acid is added to the liquid phase to partition the liquid phase into the organic phase and the aqueous phase by gravity. Solid scandium hydroxide obtained via these steps is passed to the next step as a backward extract material. Note that when adherence of the organic phase to solid scandium hydroxide is observed, the solid is preferably washed.

<Recovery of Scandium>

Scandium oxide can be recovered from nickel oxide ore by performing the roasting step S8 of roasting the solid scandium salt after the solvent extraction step S6. According to the present invention, a precipitate of scandium hydroxide has already been obtained in the backward extraction step S63 as described above. Therefore, solid scandium hydroxide can be directly calcined to obtain solid scandium oxide in the roasting step S8. However, the above scandium hydroxide may still contain impurities. Therefore, preferably, the scandium precipitation step S7 of acid-dissolving scandium hydroxide in hydrochloric acid and the like, and adding oxalic acid to obtain scandium oxalate is performed before the roasting step S8 in order to increase the purity of scandium; and that scandium oxalate is then subjected to the roasting step S8 to obtain scandium oxide.

[Scandium Precipitation Step S7]

The scandium precipitation step S7 involves neutralizing the backward extract material obtained from the solvent extraction step S6 with an acid, and further adding oxalic acid to precipitate and sediment scandium oxalate as a solid to effect separation. A pH upon dissolution in an acid is preferably 0 or more to 0.5 or less. A too low pH such as less than 0 is not preferred because the solubility of scandium oxalate is increased, resulting in a decreased recovery rate of scandium. A pH of more than 0.5 is not preferred because impurities contained in the solution may precipitate, decreasing the purity of scandium.

The addition amount of oxalic acid is preferably 1.05 times or more to 1.2 times or less relative to the equivalent amount required for precipitating scandium as an oxalate salt. An addition amount of less than 1.05 times is not preferred because total recovery of scandium may not be achieved. On the other hand, an addition amount of more than 1.2 times is not preferred because the solubility of scandium oxalate is increased, resulting in a decreased recovery rate, or the amount of an oxidizing agent such as sodium hypochlorite to be used for dissolving excess oxalic acid is increased.

[Roasting Step S8]

The roasting step S8 involves washing the precipitate obtained from the scandium precipitation step S7 with water, drying and roasting. Ultra high-grade scandium oxide can be obtained by being subjected to the roasting step S8.

There is no particular limitation for the conditions for roasting. For example, heating may be performed in a tubular furnace for about 2 hours at about 900° C. Use of a continuous furnace such as a rotary kiln is industrially preferred because drying and calcination (roasting) can be performed with the same equipment.

EXAMPLES

Below, the present invention will be described in more detail with reference to Examples, but the present invention shall not be limited to these descriptions in any sense.

Example 1

[Leaching Step S1]

First, nickel oxide ore was introduced into an autoclave along with concentrated sulfuric acid, and a slurry containing valuable metals such as scandium and nickel was generated under a condition of 245° C. over 1 hour. The slurry was then subjected to solid-liquid separation into a leachate comprising various valuable metals and a leach residue.

[Neutralization Step S2]

Then calcium carbonate was added to the leachate to obtain a neutralized precipitate and a post-neutralization liquid. Valuable metals such as scandium and nickel are contained in the post-neutralization solution, and most of the impurities such as aluminum are contained in the neutralized precipitate.

[Sulfuration Step S3]

Subsequently, gaseous hydrogen sulfide was blown to the post-neutralization liquid to separate nickel, cobalt and zinc as sulfides from the post-sulfuration liquid.

[Ion Exchange Step S4]

[Adsorption Step S4]

Slaked lime as a neutralizing agent was added to the post-sulfuration liquid to adjust the pH to 1.6. In addition, in order to characterize the behaviors of elements which were not contained in the liquid after addition of slaked lime, or contained in trace amounts if any, reagents for some of the elements were added to obtain a pre-adsorption liquid having a composition shown in Table 1.

TABLE 1

| Composition of pre-adsorption liquid (after adjustment) | | | | | | | | | | | | | | | |
|---|---|---|---|---|---|---|---|---|---|---|---|---|---|---|---|
| Sc | Al | Fe | Ni | Mg | Cr | Mn | Ti | Ca | U | Co | Th | Cu | V | Zr | Zn |
| 14 | 2800 | 1018 | 39 | 6146 | 38 | 2546 | 1.3 | 241 | 0.7 | 3 | 0.2 | 0.1 | 0.1 | 0.0 | 0.3 |

(Unit: mg/l)

Subsequently, the pre-adsorption liquid having a composition as shown in Table 1 was passed through a column packed with a chelating resin having iminodiacetic acid as a functional group (Product name: DIAION CR11, Mitsubishi Chemical Corporation). Note that the amount of the resin packed in the column was 40 liters, and the column was run at a flow rate of 5.3 ml per minute so as to obtain an SV of 8, and up to 2400 liters of the liquid was passed (Bed Volume: BV=60). The temperature of the supplied liquid when passing through a column was 60° C.

[Aluminum Removing Step S42]

Next, 800 liters of a 0.1 N sulfuric acid solution was passed through the above chelating resin at a flow rate of 27 liters per minute (which corresponds to an SV of 40). A wash liquid discharged from the column, which was rich in bound aluminum, was pooled as an aluminum wash liquid, a portion of which was sampled for ICP analysis. Analytical values were Ni: 7 mg/l, Mg: 1 mg/l, Mn: 4 mg/l, Fe: 1 mg/l, Al: 84 mg/l and Sc: 3 mg/l. The analytical values for Cr and Ca were below the detectable limits.

[Scandium Elution Step S43]

Then, 400 liters of a 1 N concentrated sulfuric acid solution was passed through the chelating resin at a flow rate of 80 liters per minute (which corresponds to an SV of 40). An eluent discharged from the column was pooled as a scandium eluent, and sampled for analysis. Results are shown in Table 2. The analytical values for Mn and Ca were below the detection limits.

TABLE 2

| Composition of scandium eluent | | | | | | | | | | | | | | | |
|---|---|---|---|---|---|---|---|---|---|---|---|---|---|---|---|
| Sc | Al | Fe | Ni | Mg | Cr | Mn | Ti | Ca | U | Co | Th | Cu | V | Zr | Zn |
| 202 | 150 | 52 | 19 | 1 | <1 | 1 | — | — | — | — | — | — | — | — | — |

(Unit: mg/l, The symbol "—" represents unanalyzed or below detection limits.)

[Chromium Removing Step S44]

Subsequently, 80 liters of a 3 N sulfuric acid was passed through the chelating resin at a flow rate of 2.6 liters per minute (which corresponds to an SV of 40). A wash liquid discharged from the column was pooled as a chromium wash liquid, and sampled for analysis. The analytical values were Fe: 2 mg/l and Cr: 30 mg/l. The analytical values for Ni, Mg, Mn, Al, Ca and Sc were below the detectable limits.

[Concentration Step S5]

Next, sodium hydroxide was added to the scandium eluent which has a composition shown in Table 2 to maintain pH at 8 to 9, thereby generating a precipitate. Sulfuric acid was added to this precipitate and dissolved, thereby obtaining a chelate eluent in which hydroxides were dissolved. The composition of the chelate eluent in which hydroxides were dissolved was analyzed. Results are shown in Table 3. The analytical values for Mg, Cr, Mn and Ca were below the detectable limits.

TABLE 3

| Composition of chelate eluent in which hydroxides are disolved | | | | | | | | | | | | | | | |
|---|---|---|---|---|---|---|---|---|---|---|---|---|---|---|---|
| Sc | Al | Fe | Ni | Mg | Cr | Mn | Ti | Ca | U | Co | Th | Cu | V | Zr | Zn |
| 20000 | 11075 | 4241 | 689 | 0 | 0 | 0 | 161 | 0 | 953 | 55 | 222 | 2 | 18 | 3 | 1 |

(Unit: mg/l)

[Solvent Extraction Step S6]
[Extraction Step S61]

The above solution which had a composition shown in Table 3 was used in an amount of 103 liters as an extraction starting liquid. This was mixed with 2.6 liters of an organic solvent in which an acidic extracting agent, di-2-ethylhexyl phosphoric acid (D2EHPA, LANXESS) was prepared into 13 vol % with a solvent Teclean N20 (JX Nikko Nippon Oil Co., Ltd.), and stirred for 60 hours at room temperature to obtain an organic phase extract containing scandium. A clad was not formed during extraction, and phase separation after allowed to stand also proceeded rapidly.

The content of each element contained in the organic phase extract was analyzed. A value obtained by dividing the amount of each element contained in the organic phase extract by the amount of that element contained in the pre-extraction liquid was taken as an extraction percentage. Results are shown in Table 4.

TABLE 4

| Extraction percentages of various elements | | | | | | | | | | | | | | | |
|---|---|---|---|---|---|---|---|---|---|---|---|---|---|---|---|
| Sc | Al | Fe | Ni | Mg | Cr | Mn | Ti | Ca | U | Co | Th | Cu | V | Zr | Zn |
| 100 | 2 | 35 | 4 | — | — | — | 99 | — | 99 | 0 | 97 | 1 | 100 | 100 | — |

(Unit: %, The symbol "—" represents unanalyzed or below detection limits.)

As understood from Table 4, almost all of the scandium contained in the pre-extraction liquid can be extracted into the organic phase extract through the extraction step S61. In addition, also understood is that almost no elements of aluminum, nickel, magnesium, chromium, manganese, calcium, cobalt, copper, zinc and the like are contained in the organic phase extract.

[Scrubbing (Washing) Step S62]

Next, 2.6 liters of the organic solvent (organic phase extract) containing scandium obtained from the extraction step was mixed with 2.6 liters of a 6.5 mol/l concentrated hydrochloric acid solution to give a phase ratio (O/A) of 1, and stirred for 10 minutes and washed. Then, it was allowed to stand for the aqueous phase to be separated, and the organic phase was again mixed with 2.6 liters of a fresh 6.5 mol/l concentrated hydrochloric acid solution and washed to allow the aqueous phase to be separated in a similar fashion. Such a washing operation was repeated 3 times in total.

By washing the organic phase extract for 3 times, impurity metals except for scandium to be eluted were able to be removed to a concentration level of 1 mg/l or less. In contrast, the loss of scandium was found to be as low as at a level of 10 mg/l, indicating that impurities can be removed efficiently without partitioning scandium extracted in the organic solvent into the aqueous phase. [Backward Extraction Step S63]

Next, 6 mol/l sodium hydroxide was mixed with the organic phase extract after washing so as to give the phase ratio O/A of 1/1, and stirred for 20 minutes to effect backward extraction of scandium into the aqueous phase. A slurry in which a solid substance precipitated by backward extraction operations was mixed with the liquid phase was obtained, which was then filtered to separate the solid substance from the liquid phase. The solid substance was washed with water to remove the organic phase and the post-backward extraction liquid adhering to the solid substance. With regard to the liquid phase, hydrochloric acid was added to the liquid phase, and stirred for 5 minutes, and then allowed to stand to separate the organic phase of the post-backward extraction organic solvent from the aqueous phase of the post-backward extraction liquid.

Further, the content of each element contained in the solid substance (scandium hydroxide) precipitated by the backward extraction operations was analyzed. The value obtained by dividing the amount of each element contained in the solid substance (scandium hydroxide) by the amount of that element extracted into the organic phase in the extraction step S61 was taken as a recovery rate. Results are shown in Table 5.

TABLE 5

| Recovery rates of various elements | | | | | | | | | | | | | | | |
|---|---|---|---|---|---|---|---|---|---|---|---|---|---|---|---|
| Sc | Al | Fe | Ni | Mg | Cr | Mn | Ti | Ca | U | Co | Th | Cu | V | Zr | Zn |
| 100 | 2 | 34 | 4 | — | — | — | 96 | — | 92 | 0 | 1 | 1 | 81 | 100 | — |

(Unit: %, The symbol "—" represents unanalyzed or below detection limits.)

As understood from Table 5, almost all scandium contained in the pre-extraction liquid can be recovered as a solid substance (scandium hydroxide) via the solvent extraction step S6. In addition, almost no elements of aluminum, nickel, magnesium, chromium, manganese, calcium, cobalt, copper, zinc and the like are contained in the recovered scandium hydroxide. Therefore, the grade of scandium contained in the scandium hydroxide can be high.

[Scandium Precipitation Step S7]

Next, the solid substance of scandium hydroxide obtained from the above step was completely dissolved while maintaining the pH of the slurry within a range of 1.0 or more to 1.5 or less by adding hydrochloric acid to the solid substance of scandium hydroxide and with stirred, thereby obtaining a re-dissolved solution. Subsequently, crystals of oxalic acid dihydrate (Mitsubishi Gas Chemical Company, Inc.) were dissolved in the re-dissolved solution in an amount calculated to be twice of the amount of scandium contained in the re-dissolved solution, and stirred and mixed for 60 minutes to generate a white crystal-like precipitate of scandium oxalate.

[Roasting Step S8]

Scandium oxalate obtained from the above scandium precipitation step was subjected to suction filtration, and washed with pure water, and dried for 8 hours at 105° C. Then, the resulting scandium oxalate was placed in a tubular furnace, and maintained at 850 to 900° C. to perform roasting (calcination), thereby obtaining scandium oxide.

The above scandium oxide was analyzed by the emission spectrochemical analysis method. The removal percentages are shown in Table 6. Impurities other than scandium, in particular, aluminum, nickel, uranium and copper were able to be removed nearly completely. Ultrahigh-purity scandium oxide was able to be obtained in which the purity as scandium oxide $Sc_2O_3$ was more than 99.9%.

TABLE 6

Removal percentage of various elements

| Sc | Al | Fe | Ni | Mg | Cr | Mn | Ti | Ca | U | Co | Th | Cu | V | Zr | Zn | Si |
|---|---|---|---|---|---|---|---|---|---|---|---|---|---|---|---|---|
| 0 | 100 | 98.7 | 99.4 | — | — | — | 97.7 | — | 99.9 | — | 54.9 | 99.4 | 96.3 | 76.2 | — | 99.5 |

(Unit: %, The symbol "—" represents unanalyzed or below detection limits.)

Example 2

The same nickel oxide ore used above in Example 1 was leached, neutralized and sulfurized by the same method as in Example 1 to obtain a post-sulfuration liquid having a composition shown in Table 7.

TABLE 7

Composition of post-sulfuration liquid

| Sc | Al | Fe | Th | U |
|---|---|---|---|---|
| 14 | 2800 | 1000 | 0.2 | 0.7 |

(Unit: mg/l)

This post-sulfuration liquid was subjected to the ion exchange step and the concentration step according to the same approach as used above in Example 1, and the resulting scandium hydroxide was dissolved again in sulfuric acid to obtain a chelate eluent in which hydroxides were dissolved. The composition of the chelate eluent in which hydroxides were dissolved was analyzed. Results are shown in Table 8.

TABLE 8

Composition of chelate eluent in which hydroxides are dissolved

| Sc | Al | Fe | Th | U |
|---|---|---|---|---|
| 20 | 11 | 4 | 140 | 220 |

(Unit: mg/l)

The chelate eluent in which hydroxides are dissolved having a composition shown in Table 8 was used as an extraction starting liquid, and subjected to solvent extraction with an acidic extracting agent. Note that PC-88A (Daihachi Chemical Industry Co., Ltd.) was used as the acidic extracting agent, which was diluted to 20% with a solvent Teclean N20 (JX Nikko Nippon Oil Co., Ltd.). The extraction equilibrium pH was set to 0, and the amount of organic matter (O) and the amount of the extraction starting liquid (A) were selected as shown in Table 9 based on the ratio of the amount of organic matter and the amount of metal in the liquid.

TABLE 9

Extraction conditions

| | Amount of organic liquid (ml) | Amount of aqueous-phase liquid (ml) | Organic matter/metal (mol/mol) | O/A |
|---|---|---|---|---|
| Example 2-1 | 70 | 15 | 1.05 | 4.67 |
| Example 2-2 | 30 | 15 | 0.45 | 2.00 |
| Comparative Example 2-1 | 100 | 15 | 1.50 | 6.67 |
| Comparative Example 2-2 | 20 | 15 | 0.30 | 1.33 |

TABLE 9-continued

Extraction conditions

| | Amount of organic liquid (ml) | Amount of aqueous-phase liquid (ml) | Organic matter/metal (mol/mol) | O/A |
|---|---|---|---|---|
| Comparative Example 2-3 | 15 | 15 | 0.22 | 1.00 |

Figure 2:
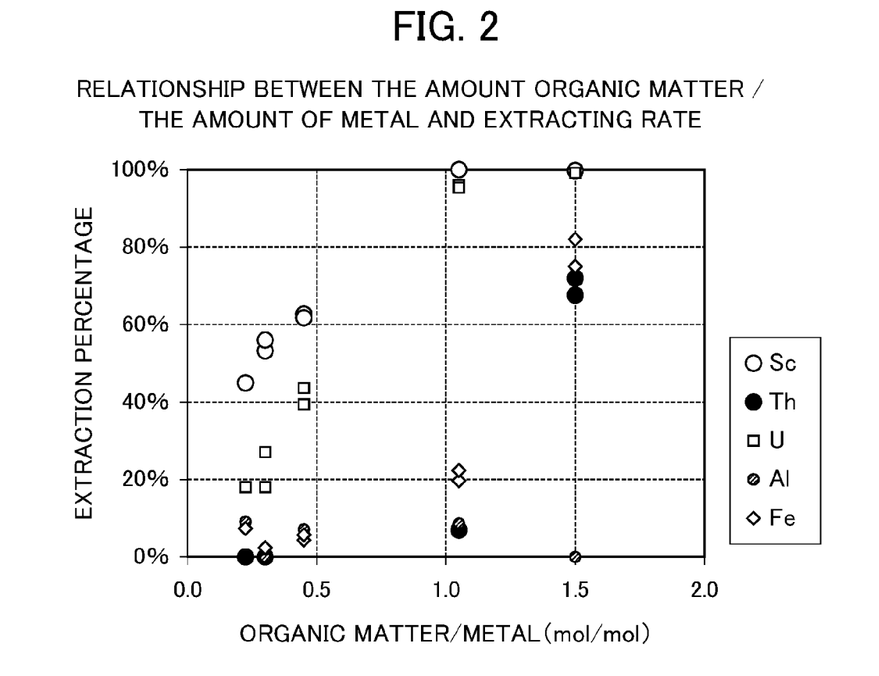
FIG. 2 shows the extraction percentages of Sc, Th, U, Al and Fe contained in the organic solvent when the aforementioned recovery method was used.

FIG. 2 shows the extraction percentages of Sc, Th, U, Al and Fe contained in the organic solvent. As shown in FIG. 2, in a case where the amount of organic matter/the amount of metal (unit: mol/mol, same below) as a ratio of the amount of organic matter relative to the amount of metal falls in the range of between 0.4 or more and 1.0 or less, scandium can be separated from thorium, aluminum and iron. Therefore, scandium can be concentrated in the organic solvent. Specifically, in a case where O/A is 2.00, the extraction percentage of scandium is 63% while the extraction percentages are 0%, 4% and 6% for thorium, iron and aluminum, respectively.

In contrast, the amount of organic matter/the amount of metal of less than 0.4 times is not preferred because the phase separation between the organic phase and the aqueous phase is poor. Further, the amount of organic matter/the amount of metal of more than 1.0 times is not preferred because metals other than scandium may also be contained in the organic phase.

Subsequently, the organic solvent PC-88A after extracting metals according to Example 2-2 was mixed with sulfuric acid, and washed under the conditions shown in Table 10.

TABLE 10

| | Concentration of sulfuric acid (mol/l) |
|---|---|
| Example 2-2-1 | 1 |
| Example 2-2-2 | 2 |
| Example 2-2-3 | 3 |
| Example 2-2-4 | 4 |
| Example 2-2-5 | 5 |

Figure 3:
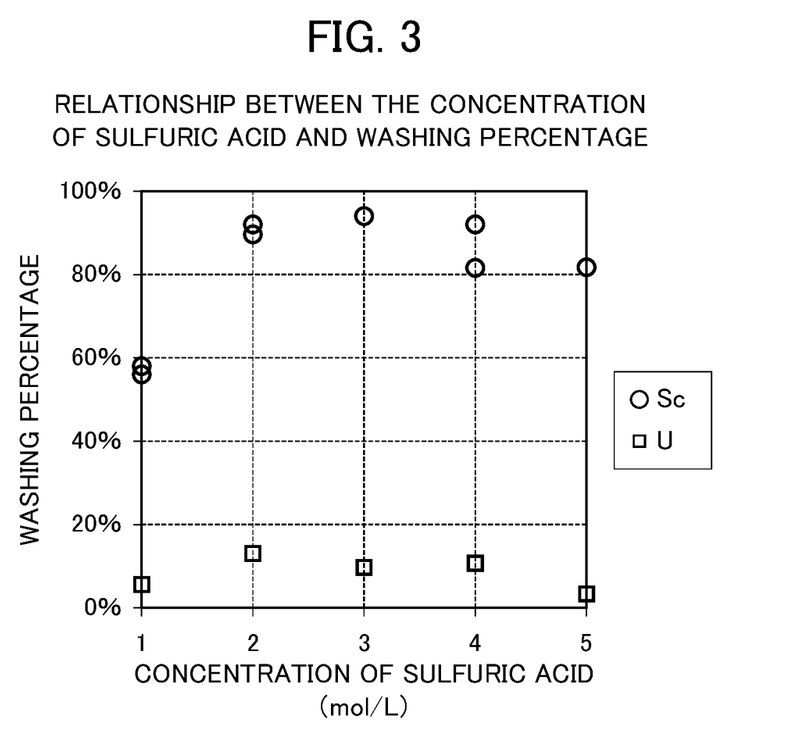
FIG. 3 shows the relationship between the concentration of sulfuric acid and the washing percentage when the aforementioned recovery method was used.

FIG. 3 shows the relationship between the concentration of sulfuric acid and the washing percentage. The washing percentage refers to a percentage of metal which is separated from the organic solvent and contained in sulfuric acid. In all samples, uranium can be separated and removed from the organic solvent. In particular, in a case where the concentration of sulfuric acid is 2 mol/l or more to 5 mol/l or less, 80% or more of uranium can be separated and removed from the organic solvent.

Then, sodium hydroxide and sodium carbonate were mixed with the organic solvent containing scandium to perform backward extraction. The results from analysis of the composition of the backward extraction liquid after the backward extraction are shown in Table 8. Note that the recovery percentage is defined as a percentage of the weight (unit: mg) of each component contained in the post-backward extraction liquid relative to the weight (unit: mg) of that component contained in the organic phase after washing with sulfuric acid.

TABLE 11

Composition of post-backward extraction liquid

|  | Sc | Th | U |
|---|---|---|---|
| Organic phase after washing with sulfuric acid | 0.094 | 0.072 | 0.075 |
| Post-backward extraction liquid | 0.092 | 0.070 | 0.073 |
| Recovery percentage | 98% | 97% | 97% |

(Unit: mg/l)

Table 11 indicates that scandium can be recovered with a recovery percentage of 95% or more.

EXPLANATION OF REFERENCE NUMERALS

S1 Leaching step
S2 Neutralization step
S3 Sulfuration step
S4 Ion exchange step
S5 Concentration step
S6 Solvent extraction step
S7 Scandium precipitation step
S8 Roasting step

The invention claimed is:

1. A method of recovering scandium, the method comprising: a leaching step of introducing nickel oxide ore containing scandium, aluminum and chromium into a pressure vessel along with sulfuric acid to perform solid-liquid separation into a leachate and a leach residue under high temperature and high pressure;
a neutralization step of adding a neutralizing agent to the leachate to obtain a neutralized precipitate and a post-neutralization solution;
a sulfuration step of adding a sulphidizing agent to the post-neutralization solution to allow separation into nickel sulfide and a post-sulfuration solution;
an ion exchange step of bringing the post-sulfuration solution into contact with a chelating resin to allow adsorption of the scandium by the chelating resin, thereby obtaining a scandium eluent;
a concentration step of generating a scandium-containing precipitate from the scandium eluent after the ion exchange step, and acid-dissolving the precipitate to obtain a scandium concentrate,
a solvent extraction step of bringing the scandium concentrate into contact with an extracting agent to obtain an extract liquid where scandium is extracted into the extracting agent, and adding a backward extracting agent to the extract liquid to obtain a backward extract material; and
a roasting step of calcining the backward extract material to obtain scandium oxide.

2. The method of recovering scandium according to claim 1, wherein the concentration step comprises:
a step of adjusting pH to a range of between 8 or more and 9 or less by adding a neutralizing agent to the scandium eluent to produce a neutralized material; and
a step of acid-dissolving the neutralized material in sulfuric acid or hydrochloric acid.

3. The method of recovering scandium according to claim 1, wherein the concentration step comprises:
a step of adding oxalic acid to the scandium eluent to generate crystals of scandium oxalate; and a step of acid-dissolving the crystals of scandium oxalate in sulfuric acid or hydrochloric acid.

4. The method of recovering scandium according to claim 1, wherein the extracting agent is an acidic extracting agent.

5. The method of recovering scandium according to claim 4, wherein the acidic extracting agent is di-2-ethylhexyl phosphoric acid.

6. The method of recovering scandium according to claim 1, wherein
the backward extracting agent is sodium hydroxide with a concentration of 5 mol/l or more to 8 mol/l or less, and the backward extract material is a precipitate of scandium hydroxide.

7. The method of recovering scandium according to claim 1, wherein the solvent extraction step comprises:
an extraction step of mixing the scandium eluent with the extracting agent to allow separation into a post-extraction organic solvent containing extracted scandium and a raffinate liquid, the extracting agent being an organic solvent;
a scrubbing step of mixing the post-extraction organic solvent with a hydrochloric acid solution with a concentration of 5.0 mol/l or more to 7.0 mol/l or less or a sulfuric acid solution with a concentration of 2.5 mol/l or more to 3.5 mol/l or less to separate impurities from the post-extraction organic solvent, thereby obtaining a post-washing organic solvent; and
a backward extraction step of adding the backward extracting agent to the post-washing organic solvent to perform backward extraction of scandium from the post-washing organic solvent, thereby obtaining the backward extract material.

8. The method of recovering scandium according to claim 4, wherein the acidic extracting agent is 2-ethylhexyl phosphoric acid-mono-2-ethylhexyl.

9. The method of recovering scandium according to claim 8, comprising:
an extraction step of mixing the scandium eluent with the extracting agent to allow separation into a post-extraction organic solvent containing extracted scandium and a raffinate liquid, the extracting agent being an organic solvent;
a scrubbing step of mixing the post-extraction organic solvent with a hydrochloric acid solution with a concentration of 5.0 mol/l or more to 7.0 mol/l or less or a sulfuric acid solution with a concentration of 2.0 mol/l or more to 5.0 mol/l or less to separate impurities from the post-extraction organic solvent, thereby obtaining a post-washing organic solvent; and a step of adding 5 mol/l or more to 8 mol/l or less of sodium hydroxide to a post-scrubbing organic solvent obtained from the scrubbing step to obtain a scandium hydroxide precipitate.

10. The method of recovering scandium according to claim 1, further comprising: a scandium precipitation step of dissolving the backward extract material in hydrochloric acid after the solvent extraction step, and adding oxalic acid to a hydrochloric acid solution obtained from the dissolution to obtain crystals of scandium oxalate, wherein the roasting step comprises calcining the crystals of scandium oxalate.

\* \* \* \* \*